(12) United States Patent
Offer et al.

(10) Patent No.: US 11,074,278 B2
(45) Date of Patent: Jul. 27, 2021

(54) METHODS FOR PERFORMING A SEARCH AND DEVICES THEREOF

(71) Applicant: JPMorgan Chase Bank, N.A., New York, NY (US)

(72) Inventors: Brendan Offer, Oradell, NJ (US); Murugan Reddi, New York, NY (US); Steven Grill, Fair Lawn, NJ (US); Malcolm West, New York, NY (US); Gavin Ramsey, Teddington (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 275 days.

(21) Appl. No.: 16/190,827

(22) Filed: Nov. 14, 2018

(65) Prior Publication Data

US 2019/0147109 A1    May 16, 2019

Related U.S. Application Data

(60) Provisional application No. 62/586,584, filed on Nov. 15, 2017.

(51) Int. Cl.
| | |
|---|---|
| *G06F 16/00* | (2019.01) |
| *G06F 16/31* | (2019.01) |
| *G06F 16/332* | (2019.01) |
| *G06F 16/33* | (2019.01) |
| *G06F 16/951* | (2019.01) |
| *G06F 16/2457* | (2019.01) |

(52) U.S. Cl.
CPC ........ *G06F 16/313* (2019.01); *G06F 16/3329* (2019.01); *G06F 16/3334* (2019.01); *G06F 16/951* (2019.01); *G06F 16/24573* (2019.01)

(58) Field of Classification Search
CPC .. G06F 16/313; G06F 16/3334; G06F 16/951; G06F 16/3329; G06F 16/24573
See application file for complete search history.

(56) References Cited

U.S. PATENT DOCUMENTS

| | | | | |
|---|---|---|---|---|
| 9,348,920 | B1* | 5/2016 | Kesin | G06F 16/31 |
| 9,767,165 | B1* | 9/2017 | Tacchi | G06F 16/345 |
| 10,255,246 | B1* | 4/2019 | Zhang | G06F 16/9535 |
| 2010/0161601 | A1* | 6/2010 | Gruber | G06F 16/367 |
| | | | | 707/736 |
| 2012/0131008 | A1* | 5/2012 | Ahn | G06F 16/367 |
| | | | | 707/741 |
| 2015/0242387 | A1* | 8/2015 | Rachevsky | G06F 16/36 |
| | | | | 704/9 |

(Continued)

*Primary Examiner* — Alexander Khong
(74) *Attorney, Agent, or Firm* — Greenblum & Bernstein, P.L.C.

(57) ABSTRACT

Methods, non-transitory machine readable media, and search engine devices are disclosed that annotate documents based on concepts and a generated composite score for each of the concepts. The concepts have an association with terms included in the documents. A query that includes at least one of the terms is received, and an associated concept and at least one additional related concept are identified in order to expand the query. The identified concepts are then applied to the annotated documents to generate a search result in response to the expanded query. This technology advantageously facilitates improved automated searching (e.g., across dialects and languages) and enables improved search result faceting.

18 Claims, 6 Drawing Sheets

(56) References Cited

U.S. PATENT DOCUMENTS

| | | | |
|---|---|---|---|
| 2016/0012044 A1* | 1/2016 | Franceschini | G06F 16/951 707/722 |
| 2016/0012057 A1* | 1/2016 | Franceschini | G06F 16/313 707/730 |
| 2016/0012058 A1* | 1/2016 | Franceschini | G06F 16/951 707/728 |
| 2016/0012122 A1* | 1/2016 | Franceschini | G06F 16/3334 707/739 |
| 2016/0012125 A1* | 1/2016 | Franceschini | G06F 16/325 707/735 |
| 2016/0179945 A1* | 6/2016 | Lastra Diaz | G06F 16/3334 707/739 |
| 2017/0083614 A1* | 3/2017 | Seuss | G06F 16/93 |
| 2017/0255700 A1* | 9/2017 | Shiftman | G06F 16/951 |

* cited by examiner

METHODS FOR PERFORMING A SEARCH AND DEVICES THEREOF

This application claims the benefit of U.S. Provisional Patent Application Ser. No. 62/586,584, filed Nov. 15, 2017, which is hereby incorporated by reference in its entirety.

FIELD

This technology generally relates to automated search engines and, more particularly, to methods and devices for improved electronic or digital document searching and concept search faceting.

BACKGROUND

Many text-based search engines process queries based on a supplied lexicon and a match of terms in a query string with terms in a searched corpus (e.g., electronic or digital documents, such as web pages). Such searching may be inoperable to provide useful results across language or dialect, is often ineffective, particularly with respect to compound terms, and may fail to consider common slang or concepts related to the query string.

In order to enhance and improve search results, tags may be used that are associated with documents and that effectively annotate the documents based on labels, terms, or concepts that are related to the documents. However, tags are currently introduced manually, thereby requiring a significant amount of resources. Further, tags are generally not accurate, comprehensive, and/or indicative of importance to the associated document, thus resulting in reduced effectiveness.

SUMMARY

A method for performing a search implemented by at least one search engine devices is disclosed. The method includes obtaining, from a corpus that includes at least one document, a plurality of concepts and a plurality of terms, each term being mapped to at least one of the concepts; determining at least one pair of concepts for which a first concept represents a specific expression of the second concept; generating, for each term, a respective term score based at least in part on a term usage frequency within the corpus; and generating, for each concept, a respective concept score based at least in part on the term scores for the terms mapped to that concept. Documents are annotated based on the concepts and corresponding concept scores. A query that includes at least one of the terms is received from a user, and then at least one pair of concepts that includes at least one concept that corresponds to the terms in the query is generated in order to expand the query. A result that is responsive to the query is then generated by applying the at least one pair of concepts to a result of the annotating.

The method may further include executing a natural language processing (NLP) pipeline operation with respect to the corpus in order to obtain the plurality of concepts and the plurality of terms. The generation of the concept scores may be based on respective weighting values associated with the concepts. Each respective weighting value may be based on a relative importance of the corresponding concept to a domain associated with a source of the received query. Each respective term score may relate to a term frequency-inverse document frequency (TF/IDF) score determined for at least one word included in the corresponding term. The method may further include generating, based on the plurality of concepts and the plurality of terms, a set of facets; receiving, from the user, a selection of at least one facet; and filtering the generated result that is responsive to the query based on the received selection.

A search engine device including a memory that includes programmed instructions stored thereon and at least one processor configured to execute the stored programmed instructions is disclosed. When the instructions are executed, the at least one processor obtains, from a corpus that includes at least one document, a plurality of concepts and a plurality of terms, each term being mapped to at least one concept; determines at least one pair of concepts for which a first concept represents a specific expression of the second concept; generates, for each term, a respective term score based at least in part on a term usage frequency within the corpus; and generates, for each concept, a respective concept score based at least in part on the term scores for the terms mapped to that concept. Documents are annotated based on the concepts and corresponding concept scores. A query that includes at least one of the terms is received from a user, and then at least one pair of concepts that includes at least one concept that corresponds to the terms in the query is generated in order to expand the query. A result that is responsive to the query is then generated by applying the at least one pair of concepts to a result of the annotating.

When the instructions are executed, the at least one processor may be further configured to execute a natural language processing (NLP) pipeline operation with respect to the corpus in order to obtain the plurality of concepts and the plurality of terms. The generation of the concept scores may be based on respective weighting values associated with the concepts. Each respective weighting value may be based on a relative importance of the corresponding concept to a domain associated with a source of the received query. Each respective term score may relate to a term frequency-inverse document frequency (TF/IDF) score determined for at least one word included in the corresponding term. The processor may be further configured to generate, based on the plurality of concepts and the plurality of terms, a set of facets; receive, from the user, a selection of at least one facet; and filter the generated result that is responsive to the query based on the received selection.

A non-transitory machine readable medium having stored thereon instructions for performing a search includes executable code that, when executed by at least one processor, causes the at least one processor to implement a method for performing a search is disclosed. The method includes obtaining, from a corpus that includes at least one document, a plurality of concepts and a plurality of terms, each term being mapped to at least one of the concepts; determining at least one pair of concepts for which a first concept represents a specific expression of the second concept; generating, for each term, a respective term score based at least in part on a term usage frequency within the corpus; and generating, for each concept, a respective concept score based at least in part on the term scores for the terms mapped to that concept. Documents are annotated based on the concepts and corresponding concept scores. A query that includes at least one of the terms is received from a user, and then at least one pair of concepts that includes at least one concepts that corresponds to the terms in the query is generated in order to expand the query. A result that is responsive to the query is then generated by applying the at least one pair of concepts to a result of the annotating.

The method may further include executing a natural language processing (NLP) pipeline operation with respect to the corpus in order to obtain the plurality of concepts and the plurality of terms. The generation of the concept scores may be based on respective weighting values associated with the concepts. Each respective weighting value may be based on a relative importance of the corresponding concept to a domain associated with a source of the received query. Each respective term score may relate to a term frequency-inverse document frequency (TF/IDF) score determined for at least one word included in the corresponding term. The method may further include generating, based on the plurality of concepts and the plurality of terms, a set of facets; receiving, from the user, a selection of at least one facet; and filtering the generated result that is responsive to the query based on the received selection.

One or more exemplary embodiments of the present disclosure provides a number of associated advantages including providing methods, non-transitory machine readable media, and search engine devices that more efficiently and effectively facilitate automated searching of electronic or digital documents, such as web pages, without requiring manual tagging of the documents. One or more exemplary embodiments advantageously enables improved searching across dialects and languages. Further, a search engine according to one or more exemplary embodiments may process generalized queries through the application of hyponyms and also recognize and score compound terms. Even further, concepts within a document may be automatically identified, thereby enabling improved search result faceting.

DETAILED DESCRIPTION

Figure 1:
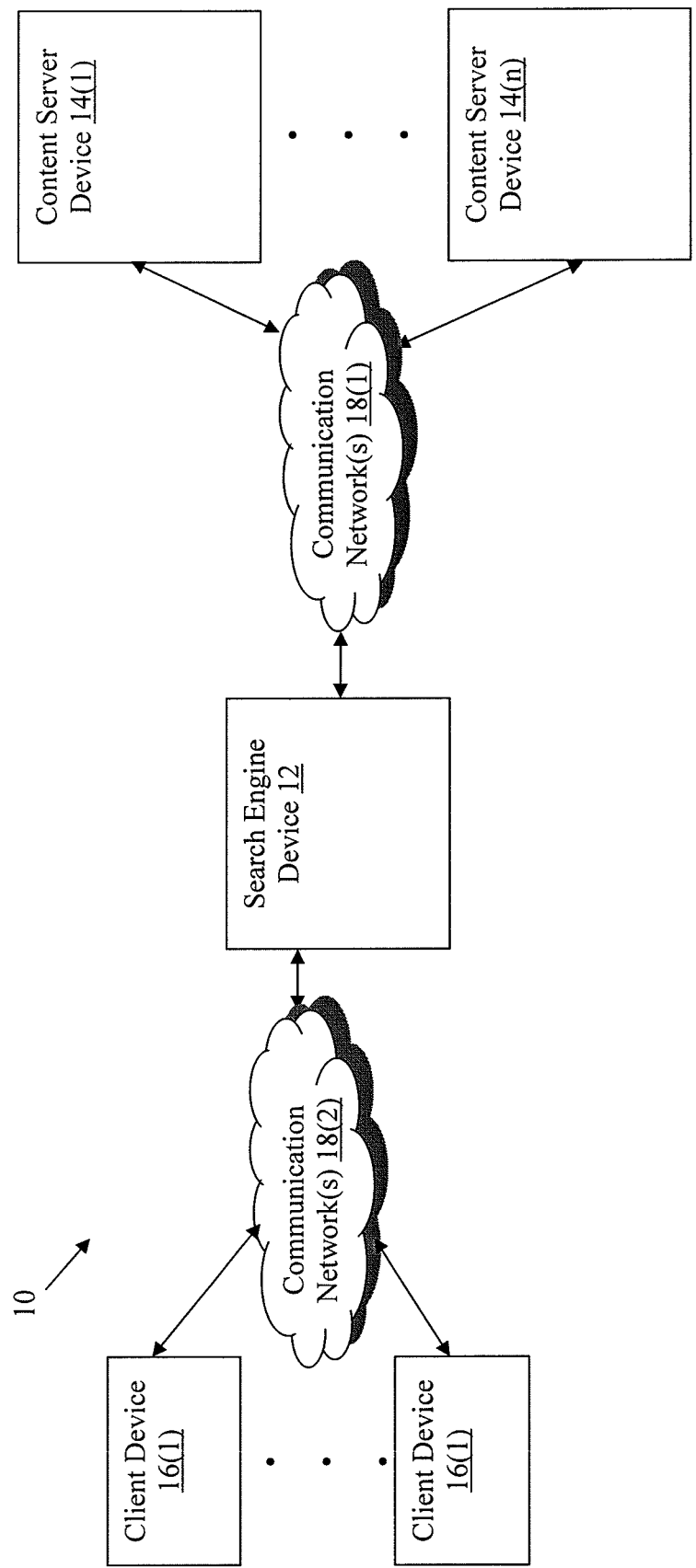
FIG. 1 is a block diagram of a network environment that includes a search engine device, according to an exemplary embodiment.

Referring to FIG. 1, an exemplary network environment 10 with an exemplary search engine device 12 is illustrated. The search engine device 12 is coupled to a plurality of content server devices 14(1)-14(n) and a plurality of client devices 16(1)-16(n) via communication network(s) 18(1) and 18(2), respectively, although the search engine device 12, content server devices 14(1)-14(n), and/or client devices 16(1)-16(n), may be coupled together via other topologies. Additionally, the network environment 10 may include other network devices, such as one or more routers and/or switches, for example, which are well known in the art and thus will not be described herein. This technology provides a number of advantages including methods, non-transitory computer readable media, and search engine devices that automatically tag concepts to electronic or digital documents to facilitate more effective searching that provides more effective results, including across languages and dialects, as well as improved result faceting. In the present disclosure, the term "faceting" refers to combining concepts and/or terms into a more specific conceptual entity that may then be used to filter a result of a search, thereby yielding a more precise and targeted response to a search query.

Figure 2:
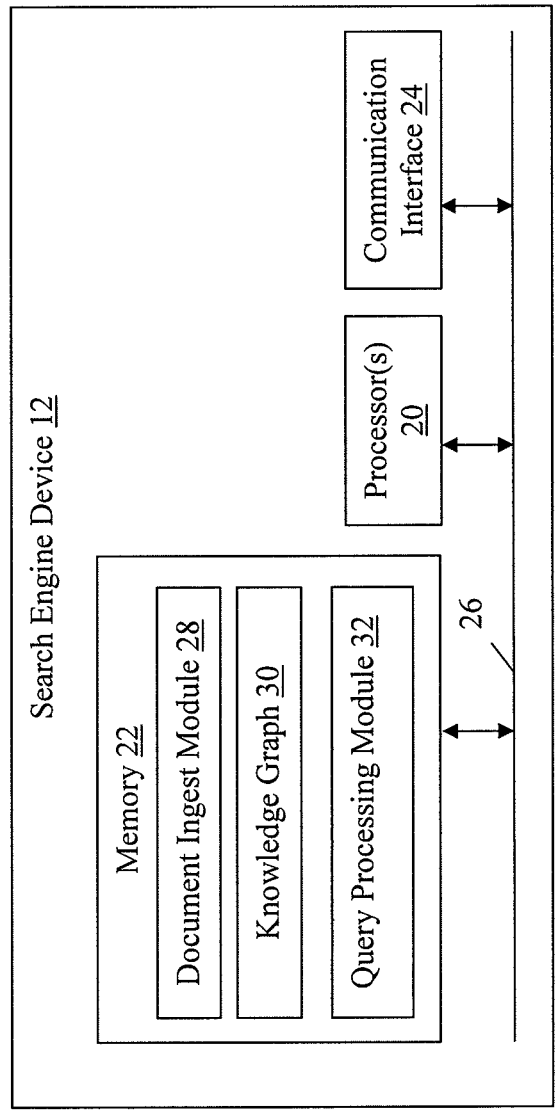
FIG. 2 is a block diagram of the search engine device shown in FIG. 1.

Referring to FIGS. 1 and 2, the search engine device 12 includes processor(s) 20, memory 22, and a communication interface 24, which are coupled together by a bus 26 or other communication link, although the search engine device 12 can include other types and/or numbers of elements in other configurations. The processor(s) 20 of the search engine device 12 may be configured to execute programmed instructions stored in the memory 22 for performing any number of the functions described and illustrated herein, including with reference to FIGS. 3, 5, and 6. The processor(s) 20 of the search engine device 12 may include one or more central processing units (CPUs) or general purpose processors with one or more processing cores, for example, although other types of processor(s) may also be used.

The memory 22 of the search engine device 12 stores the programmed instructions in accordance with one or more exemplary embodiments as described and illustrated herein, although some or all of the programmed instructions may be stored elsewhere. A variety of different types of memory storage devices, such as random access memory (RAM), read-only memory (ROM), hard disk, solid state drives, flash memory, or other computer readable medium which is read from and written to by a magnetic, optical, or other reading and writing system that is coupled to the processor(s) 20, may be used as the memory 22.

Accordingly, the memory 22 of the search engine device 12 may store one or more applications that can include executable instructions that, when executed by the search engine device 12, cause the search engine device 12 to perform actions, such as transmitting, receiving, or otherwise processing network messages, for example, and to perform other actions described and illustrated below with reference to FIGS. 3-6. The application(s) may be implemented as modules or components of other applications. Further, the application(s) may be implemented as operating system extensions, module, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the search engine device 12 itself, may be located in virtual server(s) running in a cloud-based computing environment rather than being connected to one or more specific physical network computing devices. Also, the application(s) may be running in one or more virtual machines (VMs) executing on the search engine device 12. Additionally, in one or more exemplary embodiments, virtual machine(s) running on the search engine device 12 may be managed or supervised by a hypervisor.

Referring to FIG. 2, the memory 22 of the search engine device 12 includes a document ingest module 28, a knowledge graph 30, and a query processing module 32, although the memory 22 may include other policies, modules, databases, or applications, for example. The document ingest module 28 parses documents to be ingested from the content server devices 14(1)-14(n) by executing a natural language processing (NLP) pipeline in order to extract terms and concepts from the documents. The document ingest module 28 generates respective scores for identified terms and concepts in the ingested documents, based at least in part on a frequency with which the corresponding term or concept appears in the documents, and annotates the documents based on the concepts and scores.

In an exemplary embodiment, the document ingest module 28 utilizes the knowledge graph 30 to identify and score the terms and concepts, as described and illustrated in more detail below with reference to FIG. 5. The knowledge graph 30 is a hierarchy of concepts and associated terms. In particular, the knowledge graph 30 represents one particular graphical construct that illustrates hierarchical relationships between concepts and also illustrates how terms are mapped to concepts, but other exemplary embodiments may utilize any other notional expression of the extracted concepts and terms and their respective relationships. The terms are instances of a concept expressed as a word or sequence of words. The knowledge graph 30 is described and illustrated in more detail below with reference to FIG. 4.

The query processing module 32 in the search engine device 12 receives a query string and processes the query string to generate a result set. The processing of the query string may include using the knowledge graph 30 to expand the query string to generate a compound query based on additional relevant terms and associated concepts, as described and illustrated in more detail below with reference to FIG. 6.

The communication interface 24 of the search engine device 12 operatively facilitates communications between the search engine device 12, the content server devices 14(1)-14(n), and/or the client devices 16(1)-16(n), all of which are coupled together by the communication network(s) 18(1) and 18(2). However, the present disclosure is not limited to this arrangement, and other types and/or numbers of communication networks or systems with other types and/or numbers of connections and/or configurations to other devices and/or elements may also be used.

In an exemplary embodiment, the communication network(s) 18(1) and 18(2) may include local area network(s) (LAN(s)) and/or wide area network(s) (WAN(s)), and may use Transmission Control Protocol/Internet Protocol (TCP/IP) over Ethernet and/or other industry-standard protocols, although other types and/or numbers of protocols and/or communication networks may be used. The communication network(s) 18(1) and 18(2) may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

In an exemplary embodiment, the search engine device 12 may be a standalone device or integrated with one or more other devices or apparatuses, such as one or more of the content server devices 14(1)-14(n), for example. In an exemplary embodiment, the search engine device 12 may include or be hosted by one of the content server devices 14(1)-14(n), and other arrangements are also possible. Moreover, one or more of the devices of the search engine device 12 may be in a same communication network or a different communication network, including one or more public, private, or cloud networks, for example.

In an exemplary embodiment, each of the content server devices 14(1)-14(n) includes processor(s), a memory, and a communication interface, which are coupled together by a bus or other communication link, although other numbers and/or types of network devices may be used. The content server devices 14(1)-14(n) may host content that includes text-based documents (e.g., electronic or digital documents, such as web pages) that are searchable as part of a corpus in order to process received queries by generating and outputting respective result sets that are responsive to the corresponding queries. The content server devices 14(1)-14(n) may include hardware and/or software or may represent a system with multiple servers in a pool, which may include internal or external networks.

Although the content server devices 14(1)-14(n) are illustrated as single devices in FIG. 1, one or more actions of the content server devices 14(1)-14(n) may be distributed across one or more distinct network computing devices that together comprise one or more of the content server devices 14(1)-14(n). Moreover, the content server devices 14(1)-14(n) are not limited to a particular configuration. Thus, the content server devices 14(1)-14(n) may contain a plurality of network computing devices that operate using a master/slave approach, whereby one of the network computing devices of the content server devices 14(1)-14(n) operates to manage and/or otherwise coordinate operations of the other network computing devices.

In an exemplary embodiment, the content server devices 14(1)-14(n) may operate as a plurality of network computing devices within a cluster architecture, a peer-to peer architecture, virtual machines, or within a cloud architecture. Thus, the present disclosure is not to be construed as being limited to a single environment, and other configurations and architectures are also envisaged.

In an exemplary embodiment, the client devices 16(1)-16(n) include any type of computing device that is able to interface with the search engine device 12 to submit queries and receive result sets. In an exemplary embodiment, each of the client devices 16(1)-16(n) includes processor(s), memory, and a communication interface, which are coupled together by a bus or other communication link, although other numbers and/or types of network devices may be used.

The client devices 16(1)-16(n) may run interface applications, such as standard web browsers or standalone client applications, which may provide an interface to facilitate communication with the search engine device 12 via the communication network(s) 18(2) in order to communicate query strings. The client devices 16(1)-16(n) may further include a display device, such as a display screen or touchscreen, and/or an input device, such as a keyboard, a mouse, a touchpad, and/or a stylus, for example.

Although the exemplary network environment 10 with the search engine device 12, content server devices 14(1)-14(n), client devices 16(1)-16(n), and communication network(s) 18(1) and 18(2) are described and illustrated herein, other types and/or numbers of systems, devices, components, and/or elements in other topologies can be used. It is to be understood that the systems of the exemplary embodiments described in the present disclosure are provided for exemplary purposes, as many variations of the specific hardware and software used to implement the examples are possible, as will be appreciated by persons having ordinary skill in the art.

One or more of the devices depicted in the network environment 10, such as the search engine device 12, client devices 16(1)-16(n), and/or content server devices 16(1)-16(n), for example, may be configured to operate as virtual entities on the same physical machine. In this aspect, one or more of the search engine device 12, client devices 16(1)-16(n), or content server devices 16(1)-16(n) may operate on the same physical device rather than as separate devices communicating via communication network(s) 18(1) or 18(2). Additionally, there may be more or fewer search engine devices, client devices, or content server devices than illustrated in FIG. 1.

In addition, two or more computing systems or devices can be substituted for any one of the systems or devices in any exemplary embodiment. Accordingly, principles and advantages of distributed processing, such as redundancy and replication also can be implemented, as desired, to increase the robustness and performance of the devices and systems of the exemplary embodiments. The exemplary embodiments may also be implemented on computer system(s) that extend across any suitable network using any suitable interface mechanisms and traffic technologies, including, by way of example only, teletraffic in any suitable form (e.g., voice and modem), wireless traffic networks, cellular traffic networks, Packet Data Networks (PDNs), the Internet, intranets, and combinations thereof.

The exemplary embodiments may also be implemented as one or more non-transitory computer readable media, such as the memory 22, having instructions stored thereon for one or more aspects of the present disclosure, as described and illustrated by way of the exemplary embodiments disclosed herein. The instructions in some exemplary embodiments include executable code that, when executed, such as by the processor(s) 20, for example, cause the processor(s) 20 to carry out steps necessary to implement the methods of the exemplary embodiments that are described and illustrated herein including with reference to FIGS. 3, 5, and 6.

Figure 3:
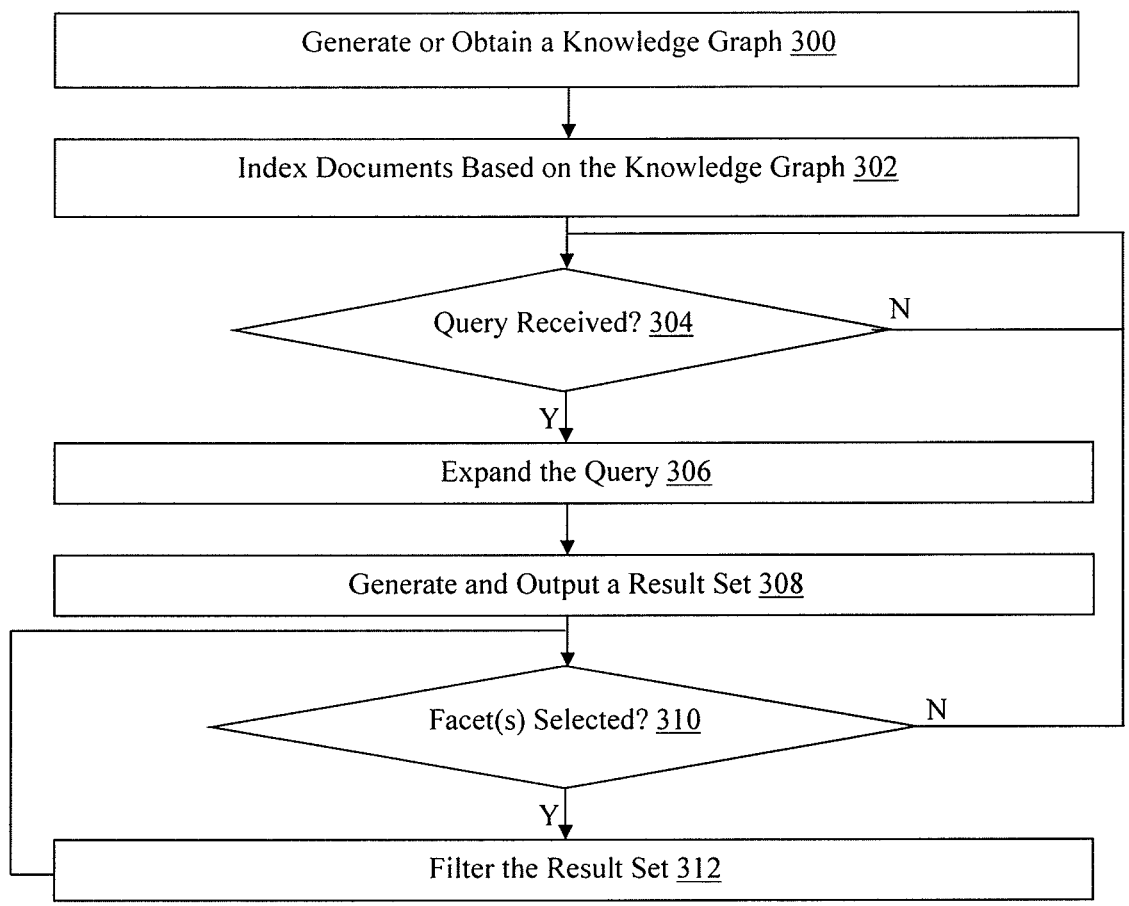
FIG. 3 is a flowchart that illustrates a method for performing a search, according to an exemplary embodiment.
Figure 4:
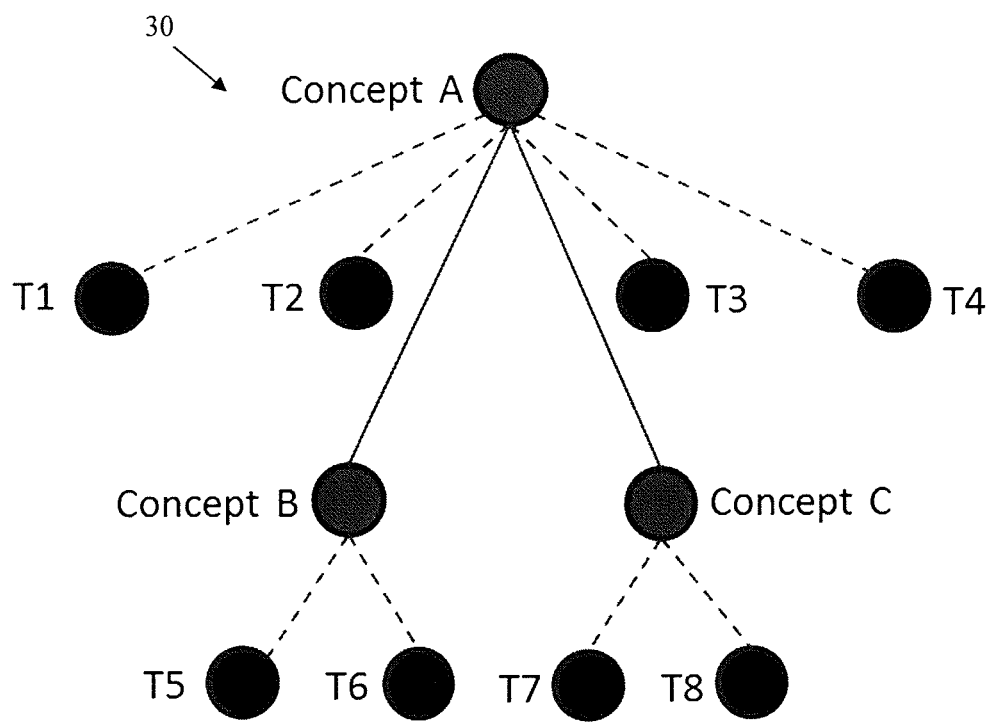
FIG. 4 is an illustration of a knowledge graph, according to an exemplary embodiment.

An exemplary method for performing a search will now be described with reference to FIG. 3. In step 300, the search engine device 12 generates or obtains and stores a knowledge graph 30. The knowledge graph 30 is a taxonomic representation of extracted knowledge in the form of a hierarchy of concepts, and the hierarchy is arranged as a function of generality/specificity of a concept, i.e., from general at the top to specific at the bottom, optionally with associated terms. Concepts are abstract ideas that relate to the fundamental characteristics of an entity. Terms are instances of a concept expressed as a word or sequence of words. Thus, as illustrated in FIG. 4, Concept A is a relatively general concept; Concept B is a specific expression of Concept A, i.e., a more specific concept that represents a narrower conceptual space that that represented by Concept A; and Concept C is a different specific expression of Concept A. Further, each of T1, T2, T3, and T4 is a term that maps to Concept A; each of T5 and T6 is a term that maps to Concept B; and each of T7 and T8 is a term that maps to Concept C.

Referring to FIG. 4, an exemplary knowledge graph 30 is illustrated. In this example, terms that map to the same concept are synonyms within the level of abstraction defined by the concept; (e.g., T1, T2, T3, and T4 are synonyms). Additionally, terms that are mapped to a child concept are hyponyms or specializations of terms mapped to the parent concept (e.g., T5 is a hyponym of T1).

Optionally, in some exemplary embodiments, the concepts in the knowledge graph may be associated with respective stochastic or weighting values. The weighting values can be user-defined, such as via a provided graphical user interface, and can be automatically adjusted based on direct user-provided feedback or derived feedback based on monitoring search utilization or activity. Additionally, the weighting values may vary according to particular domains, such that a particular concept may have a higher associated weighting value with respect to a domain in which the particular concept is of more relevance or importance.

Referring again to FIG. 3, in step 302, the search engine device 12 indexes documents based on the knowledge graph 30. The documents can be obtained from the content server devices 14(1)-14(n), for example, although the documents can be obtained from other sources in other exemplary embodiments. The documents can be text-based electronic or digital documents and can take the form of web documents or pages, although other types of documents can also be used.

Figure 5:
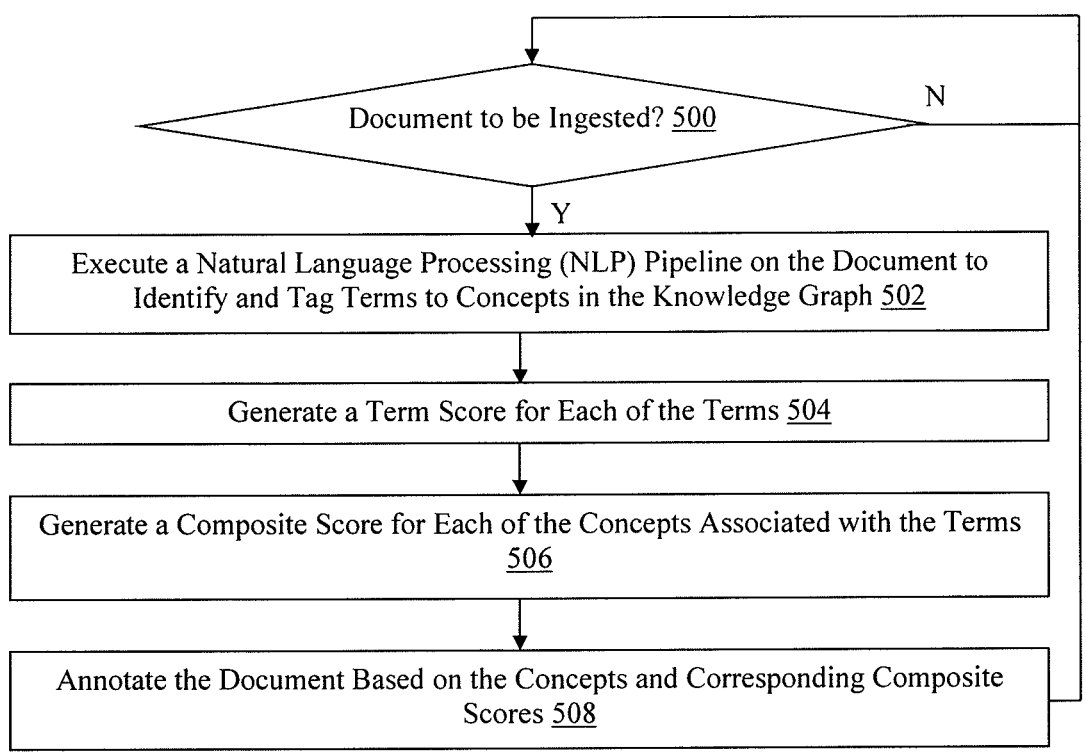
FIG. 5 is a flowchart that illustrates a method for indexing documents, according to an exemplary embodiment.

Referring also to FIG. 5, an exemplary method for indexing documents is illustrated. In step 500, the search engine device 12 determines whether a document is to be ingested. Optionally, an administrator may identify a location on the content server devices 14(1)-14(n), at which documents to be ingested are located, in order to initiate the indexing of the documents. If the search engine device 12 determines that there are no documents to ingest, then the No branch is taken and the search engine device 12 waits for documents to ingest. However, if the search engine device 12 determines that there is a document to ingest, then the Yes branch is taken to step 502.

In step 502, the search engine device 12 executes a natural language processing (NLP) pipeline operation on the document to identify and tag terms to concepts in the knowledge graph 30. In one exemplary embodiment, the NLP pipeline operation is executed based on the following steps, although other step sequences are also possible:

(1) Tokenizing

In an exemplary embodiment, tokenizing includes categorizing the text into simple tokens such as numbers, punctuation and words of different types. For example, tokenizing distinguishes between words in uppercase and lowercase, and between certain types of punctuation.

(2) Sentence Splitting

In an exemplary embodiment, sentence splitting includes segmenting the text into sentences. The operation of sentence splitting may use a list of abbreviations as provided, for example, in a gazetteer, in order to help distinguish sentence-marking full stops from other types of punctuation.

(3) Part of Speech Tagging

In an exemplary embodiment, part of speech (POS) tagging includes providing an indication as to a part of speech that corresponds to a word. In particular, POS tagging may include identifying words such as nouns, verbs, adjectives, or adverbs, for example.

(4) Morphological Analyzing

In an exemplary embodiment, morphological analysis includes reviewing each token and its POS tag and identifying its lemma and an affix. As a result, a single gazetteer term may be determined as matching or corresponding to multiple forms of the same word (e.g., singular versus plural or different verb tenses).

(5) Application of a Flexible Gazetteer

In an exemplary embodiment, the application of a flexible gazetteer includes identifying terms from a controlled vocabulary within the text and tagging each term with at least one concept to which the term relates in the knowledge graph 30.

In step 504, the search engine device 12 generates a term score for each of the terms. In an exemplary embodiment, the term scores are term frequency-inverse document frequency (TF/IDF) scores calculated for both individual and compound words annotated by a gazetteer. Term Frequency (TF) is the number of times a term appears within a given document and is a measure of the relative weighting of the term. Inverse Document Frequency (IDF) represents the inverse of the number of documents a term appears in and measures the specificity of a term. Accordingly, the term score is a statistic which reflects a relative importance of a term with respect to an individual document within a set of documents or a corpus.

In step 506, the search engine device 12 generates a composite score (also referred to herein as a "concept score") for each of the concepts associated with the terms. In an exemplary embodiment, all annotated terms that relate to one particular concept are aggregated and a composite concept score is calculated from the term scores for the corresponding terms. Accordingly, concepts are scored using a function of their constituent term scores in this example. The aggregation may be based on an average of all the non-zero term scores. For example, if a concept maps to three terms, two of which are discovered in a document, then the concept score may be calculated as the average of the two term scores. Additionally, any weighting values attached to particular concepts may also be used to generate the concept score. Other methods of generating the composite scores may also be used in other exemplary embodiments.

In step 508, the search engine device 12 annotates the document based on the concepts and the corresponding composite scores. Accordingly, the document 12 is tagged with its set of extracted concepts and their composite scores, and subsequently indexed (e.g., into a search engine such as by Elasticsearch).

Referring again to FIG. 3, in step 304, the search engine device 12 determines whether a query is received, such as from one of the client devices 16(1)-16(n), for example. If the search engine device 12 determines that a query has not been received, then the No branch is taken back to step 304 and the search engine device 12 effectively waits for a query. However, if the search engine device 12 determines that a query has been received, then the Yes branch is taken to step 306.

In step 306, the search engine device 12 expands the query. Conventional keyword searches often return results that include many non-relevant items (false positives) or that exclude too many relevant items (false negatives). However, this technology advantageously widens the search to avoid the false negatives and then uses interactive filtering to remove the false positives, which is not well-understood, routine, or conventional in the art.

Figure 6:
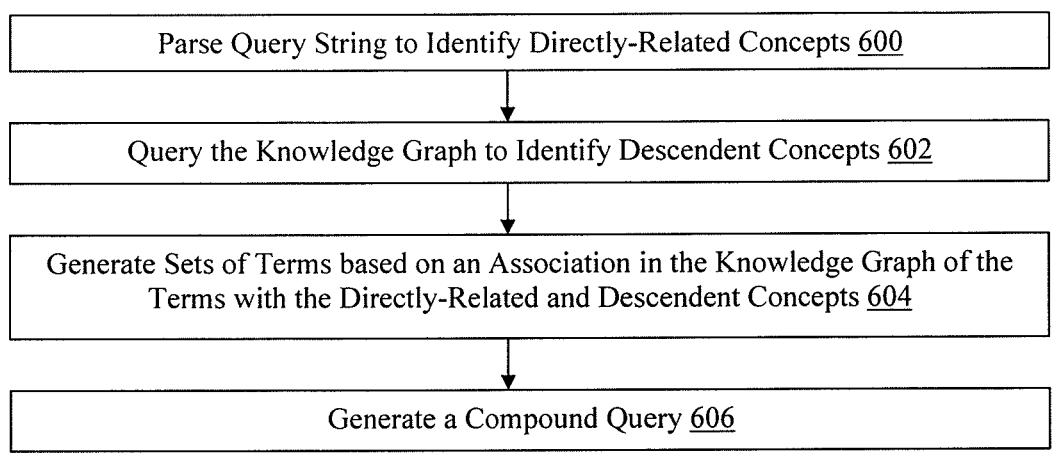
FIG. 6 is a flowchart that illustrates a method for expanding a query, according to an exemplary embodiment.

Referring to FIG. 6, an exemplary method for expanding a query is illustrated. In step 600, the search engine device 12 parses the query string included in the received query in order to identify directly-related concepts. Optionally, the NLP pipeline operation described and illustrated above with reference to FIG. 5 may be used to identify the concepts that relate to the search query in combination with the knowledge graph 30.

In step 602, the search engine device 12 queries the knowledge graph 30 to identify concepts that are descendent from the directly-related concepts identified in step 600. The process of identifying descendent concepts can be referred to as hyponym extraction. Alternatively, even if a knowledge graph is unavailable, the search engine device 12 may use at least one identified concept to determine a related concept that represents a specific expression thereof.

In step 604, the search engine device 12 generates sets or "buckets" of terms based on an association in the knowledge graph 30 of the terms with the directly-related and descendent concepts. In an exemplary embodiment, the terms are grouped (i.e., "bucketed") based on how many generations they are away from the original query concepts, i.e., a hierarchical distance between a particular term and the corresponding concept that is included in the original query.

In step 606, the search engine device 12 generates a compound query based on the sets of terms generated in step 604. In an exemplary embodiment, a term that corresponds to a concept that is more closely associated with the query string is assigned a relatively high weight, and a term that corresponds to a concept that is more distantly associated with the query string is assigned a relatively low weight.

Referring again to FIG. 3, in step 308, the search engine device 12 generates and outputs a result set. Accordingly, in an exemplary embodiment, the compound query generated in step 306 based on the expansion of the query string may be sent to a search engine, such as Elasticsearch, for example, in order to generate a result set including a subset of the ingested documents that may be responsive to the query. The result set may be generated based on the annotation of the documents, including the composite scores, as described and illustrated above with reference to step 508 of FIG. 5, as well as the compound query and associated weights for terms included therein.

In step 310, the search engine device 12 determines whether any facet(s) are selected (e.g., via an interactive interface provided to one of the client devices from which the query was received in step 304) in order to filter the result set. Result set filtering (also referred to herein as "faceting") maximizes the precision of a given query, by incrementally applying filters, and facilitates obtaining improved results that are more targeted to the query based on the inclusion of a related, more specific concept. Optionally, one or more of the internally-represented concepts or terms may be abstracted in order to present candidate facets to a user, via a stored mapping, that may be relatively meaningful to a user and that are externalized to facilitate selection by a user in order to reduce or focus the result set, although other methods of generating the facets may be used.

If the search engine device 12 determines that a facet has not been selected, then the search engine device 12 proceeds back to step 304 and again waits for a query to be received. However, if the search engine device 12 determines that a facet has been selected, then the Yes branch is taken to step 312.

In step 312, the search engine device 12 filters the result set generated and outputted in step 308. In an exemplary embodiment, faceting on the concepts from the knowledge graph is supported such that every time a concept (also referred to as a "concept chip") is selected in the provided interactive interface an additional search is triggered.

Accordingly, it is possible to filter on any concept in the knowledge graph 30. Each time a filter is applied, a new search is generated, which adds further restrictions to the search query (e.g., as new sub-clauses). Additionally, filters may be connected via an 'AND' relationship, such that when each new filter is applied, the query becomes more restrictive, and the result set either remains unchanged or decreases in size.

Accordingly, in one or more exemplary embodiments, terms are mapped to concepts in order to advantageously facilitate translation between different dialects and facilitate searching across dialects and languages. For example, two different terms that used by disparate communities but that have the same intended meaning can be mapped to a single canonical concept. In an exemplary embodiment, the use of a knowledge graph enables a search engine to process generalized queries via the application of hyponyms. Further, by using the information represented in the knowledge graph, the search engine may advantageously recognize and score compound terms. Even further, automatically identifying concepts within a document in accordance with one or more exemplary embodiments advantageously enables improved search result faceting without a need for manual tagging.

Having thus described one or more exemplary embodiments, it will be apparent to persons having ordinary skill in the art that the foregoing disclosure is intended to be presented by way of example only, and is not limiting. Various alterations, improvements, and modifications will occur and are intended to persons having ordinary skill in the art, though not expressly stated herein. These alterations, improvements, and modifications are intended to be suggested hereby, and are within the spirit and scope of the present disclosure. Additionally, the recited order of processing elements or sequences, or the use of numbers, letters, or other designations therefore, is not intended to limit the claimed processes to any order except as may be specified in the claims. Accordingly, the present disclosure is limited only by the following claims and equivalents thereto.

What is claimed is:

1. A method for performing a search implemented by at least one search engine device, the method comprising:
   obtaining, from a corpus that includes at least one document, a plurality of concepts and a plurality of terms, each of the plurality of terms being mapped to at least one of the plurality of concepts;
   determining at least one pair of concepts from among the plurality of concepts for which a first concept within the at least one pair of concepts represents a specific expression of a second concept within the at least one pair of concepts;
   generating, for each of the plurality of terms, a respective term score based at least in part on a term usage frequency within the corpus;
   generating, for each of the plurality of concepts, a respective concept score by aggregating the term scores of all terms from among the plurality of terms that are mapped thereto and calculating an average of a result of the aggregating;
   annotating each of the at least one document by tagging each document with each concept from among the plurality of concepts to which at least one term that appears within the at least one document from among the plurality of terms is mapped, and with a corresponding concept score;
   receiving, from a user, a query that includes at least a first term from among the plurality of terms;
   generating, based on the received query, a first subset of concepts from among the plurality of concepts, the first subset of concepts including at least a first pair of concepts from among the determined at least one pair of concepts, the first pair of concepts including at least one concept to which the at least first term is mapped and at least one additional concept; and
   generating a result that is responsive to the query by applying the generated first subset of concepts to a result of the annotating.

2. The method as set forth in claim 1, wherein the obtaining the plurality of concepts and the plurality of terms comprises executing a natural language processing pipeline operation with respect to the corpus.

3. The method as set forth in claim 1, wherein the generating the respective concept score is based on a respective weighting value associated with each of the plurality of concepts.

4. The method as set forth in claim 3, wherein each respective weighting value is based on a relative importance of a corresponding one of the plurality of concepts to a domain associated with a source of the received query.

5. The method as set forth in claim 1, wherein each respective term score relates to a term frequency inverse document frequency score determined for at least one word included in a corresponding term.

6. The method as set forth in claim 1, further comprising:
   generating, based on the plurality of concepts and the plurality of terms, a set of facets by generating a compound query for which a term weight corresponds to a degree of association with a concept included in the compound query and outputting a result of the compound query as the set of facets;
   receiving, from the user, a selection of at least one facet from among the generated set of facets; and
   filtering the generated result that is responsive to the query based on the received selection.

7. A search engine device, comprising:
   a memory comprising programmed instructions stored thereon; and
   at least one processor,
   wherein the at least one processor is configured to execute the stored programmed instructions to:
      obtain, from a corpus that includes at least one document, a plurality of concepts and a plurality of terms, each of the plurality of terms being mapped to at least one of the plurality of concepts;
      determine at least one pair of concepts from among the plurality of concepts for which a first concept within the at least one pair of concepts represents a specific expression of a second concept within the at least one pair of concepts;
      generate, for each of the plurality of terms, a respective term score based at least in part on a term usage frequency within the corpus;
      generate, for each of the plurality of concepts, a respective concept score by aggregating the term scores of all terms from among the plurality of terms that are mapped thereto and calculating an average of a result of the aggregating;
      annotate each of the at least one document by tagging each document with each concept from among the plurality of concepts to which at least one term that appears within the at least one document from among the plurality of terms is mapped, and with a corresponding concept score;
      receive, from a user, a query that includes at least a first term from among the plurality of terms;
      generate, based on the received query, a first subset of concepts from among the plurality of concepts, the first subset of concepts including at least a first pair of concepts from among the determined at least one pair of concepts, the first pair of concepts including at least one concept to which the at least first term is mapped and at least one additional concept; and
      generate a result that is responsive to the query by applying the generated first subset of concepts to a result of the annotating.

8. The search engine device as set forth in claim 7, wherein the at least one processor is further configured to execute the stored programmed instructions to execute a natural language processing pipeline operation with respect to the corpus.

9. The search engine device as set forth in claim 7, wherein the at least one processor is further configured to execute the stored programmed instructions to generate the respective concept score based on a respective weighting value associated with each of the plurality of concepts.

10. The search engine device as set forth in claim 9, wherein each respective weighting value is based on a relative importance of a corresponding one of the plurality of concepts to a domain associated with a source of the received query.

11. The search engine device as set forth in claim 7, wherein each respective term score relates to a term frequencyinverse document frequency score determined for at least one word included in a corresponding term.

12. The search engine device as set forth in claim 7, wherein the at least one processor is further configured to execute the stored programmed instructions to:
generate, based on the plurality of concepts and the plurality of terms, a set of facets by generating a compound query for which a term weight corresponds to a degree of association with a concept included in the compound query and outputting a result of the compound query as the set of facets;
receive, from the user, a selection of at least one facet from among the generated set of facets; and
filter the generated result that is responsive to the query based on the received selection.

13. A non-transitory machine readable medium having stored thereon instructions for performing a search comprising executable code which, when executed by at least one processor, causes the at least one processor to:
obtain, from a corpus that includes at least one document, a plurality of concepts and a plurality of terms, each of the plurality of terms being mapped to at least one of the plurality of concepts;
determine at least one pair of concepts from among the plurality of concepts for which a first concept within the at least one pair of concepts represents a specific expression of a second concept within the at least one pair of concepts;
generate, for each of the plurality of terms, a respective term score based at least in part on a term usage frequency within the corpus;
generate, for each of the plurality of concepts, a respective concept score by aggregating the term scores of all terms from among the plurality of terms that are mapped thereto and calculating an average of a result of the aggregating;
annotate each of the at least one document by tagging each document with each concept from among the plurality of concepts to which at least one term that appears within the at least one document from among the plurality of terms is mapped, and with a corresponding concept score;
receive, from a user, a query that includes at least a first term from among the plurality of terms;
generate, based on the received query, a first subset of concepts from among the plurality of concepts, the first subset of concepts including at least a first pair of concepts from among the determined at least one pair of concepts, the first pair of concepts including at least one concept to which the at least first term is mapped and at least one additional concept; and
generate a result that is responsive to the query by applying the generated first subset of concepts to a result of the annotating.

14. The non-transitory machine readable medium as set forth in claim 13, wherein the executable code when executed by the at least one processor further causes the at least one processor to execute a natural language processing pipeline operation with respect to the corpus.

15. The non-transitory machine readable medium as set forth in claim 13, wherein the executable code when executed by the at least one processor further causes the at least one processor to generate the respective concept score based on a respective weighting value associated with each of the plurality of concepts.

16. The non-transitory machine readable medium as set forth in claim 15, wherein each respective weighting value is based on a relative importance of a corresponding one of the plurality of concepts to a domain associated with a source of the received query.

17. The non-transitory machine readable medium as set forth in claim 13, wherein each respective term score relates to a term frequency-inverse document frequency score determined for at least one word included in a corresponding term.

18. The non-transitory machine readable medium as set forth in claim 13, wherein the executable code when executed by the at least one processor further causes the at least one processor to:
generate, based on the plurality of concepts and the plurality of terms, a set of facets by generating a compound query for which a term weight corresponds to a degree of association with a concept included in the compound query and outputting a result of the compound query as the set of facets;
receive, from the user, a selection of at least one facet from among the generated set of facets; and
filter the generated result that is responsive to the query based on the received selection.

* * * * *